No. 880,706. PATENTED MAR. 3, 1908.
J. L. WOODBRIDGE.
ELECTRICAL DISTRIBUTION.
APPLICATION FILED JAN. 12, 1906.
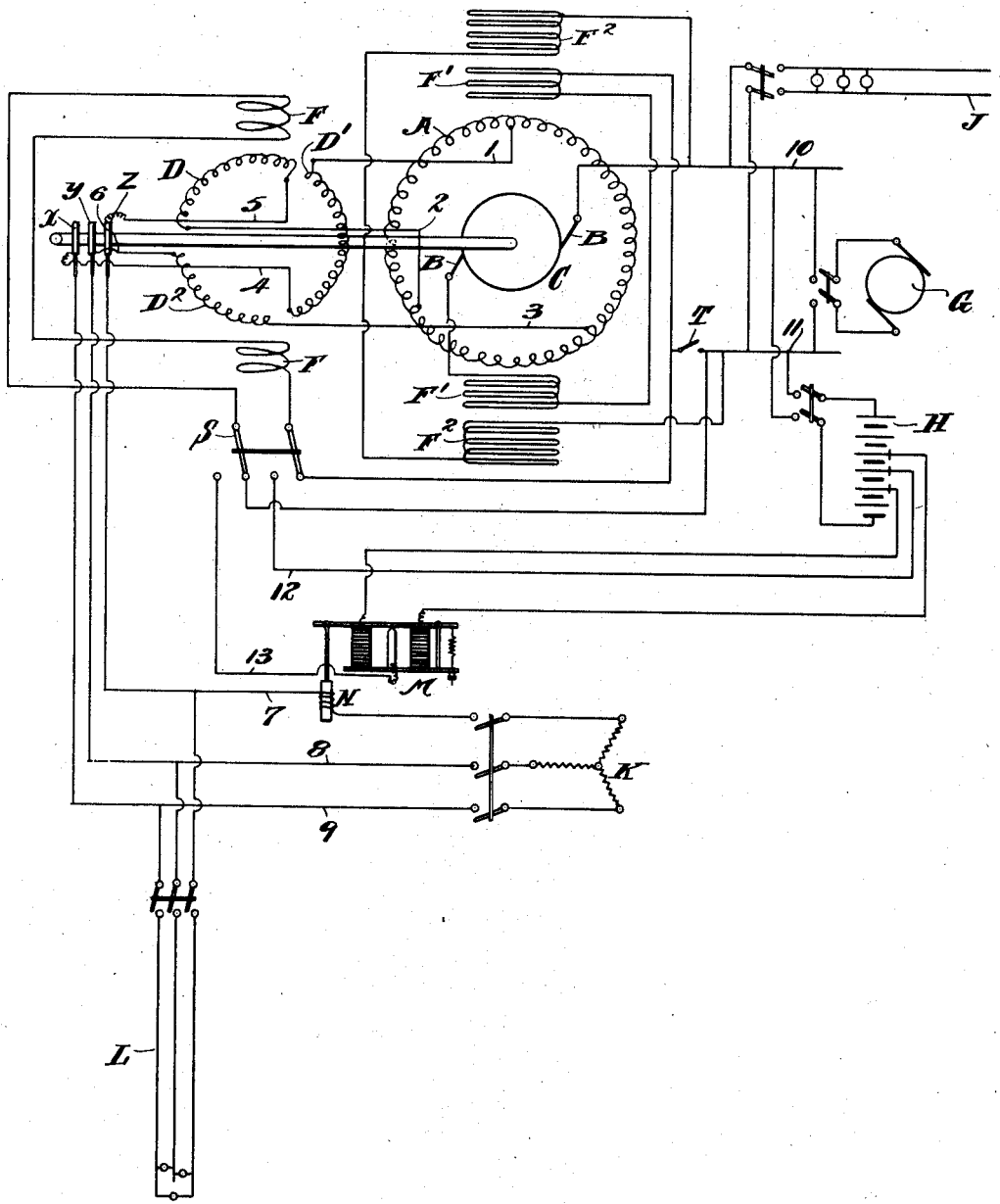
WITNESSES:
INVENTOR.
Joseph L. Woodbridge.
BY
Augustus B. Stoughton
ATTORNEY.

UNITED STATES PATENT OFFICE.

JOSEPH LESTER WOODBRIDGE, OF PHILADELPHIA, PENNSYLVANIA.

ELECTRICAL DISTRIBUTION.

No. 880,706.　　　Specification of Letters Patent.　　　Patented March 3, 1908.

Application filed January 12, 1906. Serial No. 295,682.

*To all whom it may concern:*

Be it known that I, JOSEPH LESTER WOODBRIDGE, a citizen of the United States, and resident of Philadelphia, in the county of Philadelphia and State of Pennsylvania, have invented certain new and useful Improvements in Electrical Distribution, of which the following is a specification.

The principal object of the present invention is to provide for causing the transfer of energy in either direction between alternating and direct current circuits having appropriate sources and at the same time compensating for or determining the voltage characteristics of either.

Other objects of the invention will appear from the following description and the invention itself will be finally claimed.

The drawings illustrate diagrammatically a system of distribution embodying features of the invention.

In the drawings A, is the armature winding of a rotary converter, C, the commutator, and B, the direct current brushes from which connection is made to the direct current circuit 10, 11. Mounted on the same shaft with the rotary armature, is an auxiliary armature whose windings are shown at D, $D^1$ and $D^2$. Three phase connections 1, 2, and 3, are shown between the armature winding A and the auxiliary windings D, $D^1$, and $D^2$, and corresponding conductors 4, 5, and 6, connect the opposite terminals of the windings D, $D^1$ and $D^2$ to suitable collector rings $x$, $y$, $z$, which are connected by suitable brushes to the alternating current circuit 7, 8, 9. The armature windings D, $D^1$ and $D^2$, revolve in a magnetic field produced by the coils F, and these windings are so designed that an alternating electro-motive force will be developed in them in phase with the electro-motive force developed at the points in the armature winding A, to which they are respectively connected by the conductors 1, 2 and 3. The auxiliary electro-motive force developed in the windings D, $D^1$ and $D^2$ may be made to oppose or assist that of the armature winding A by any desired amount, according to the amount and direction of the current in the field windings F. The fields of the rotary are shown as excited by the usual shunt field winding $F^2$, and series winding $F^1$. The ratio between the alternating current electro-motive force at the collector rings $x$, $y$, $z$ and the direct current electro-motive force at the brushes B, may be varied in any desired amount by suitably controlling the current in the field windings F, $F^1$ and $F^2$. Thus if it is desired to increase the alternating current electromotive force at the collector rings $x$, $y$, $z$, without altering the direct current electromotive force at the brushes B, this may be accomplished by increasing the current in the field windings F. If on the other hand it is desired to increase the direct current electro-motive force at the brushes B, without altering the alternating current electromotive force at the collector rings $x$, $y$, $z$, the current in the field windings $F^1$ or $F^2$ must be increased, while the current in the field windings F must be reduced or reversed to such an extent that the change in the electro-motive force induced in the windings D, $D^1$ and $D^2$ will be sufficient to neutralize the increase in the alternating current electro-motive force produced in the armature winding A by the increase of current in the field windings $F^1$ and $F^2$. Arranged for connection to the direct current circuit 10, 11 is shown a direct current generator G, also a storage battery H, and a consumption circuit J. Arranged for connection to the alternating current circuit 7, 8, 9, are shown an alternating current generator K, and an alternating current consumption circuit L.

Two methods of controlling the field excitation produced by the windings F, are shown, either of which may be put into operation by throwing the double pole switch S into the proper position. When the switch S is in the position shown in the drawing, the field windings F, are connected in series between the direct current brushes of the rotary and the direct current circuit 10, 11. If now the direct current generator G and the storage battery H are disconnected from the direct current circuit 10, 11, and the consumption circuit J is connected to said direct current circuit, and if the alternator K, is connected to the alternating current circuit 7, 8, 9, any increase in load on the consumption circuit J will increase the current in the coils F, and thus increase the alternating current electromotive force applied to the armature winding A. The said increase of load in the consumption circuit J will also increase the current in the series winding $P^1$ of the rotary, and if the various parts are properly designed the result will be a "compounding" or "overcompounding" of the rotary; that is, an increase of its direct current voltage with increase of load. If now the direct current generator G remains disconnected and the consumption circuit J is also disconnected, and the battery H is connected to the direct current circuit 10, 11, and if the alternator K is disconnected and the consumption circuit L is connected to the alternating current circuit 7, 8, 9, the coils F and $F^1$, $F^1$ may be so designed that any increase of load on the alternating current circuit L will, by taking current from the battery through the rotary and through the windings F and $F^1$, produce an increase in the ratio of the alternating current electro-motive force at the collector rings $x$, $y$, $z$, to the direct current electro-motive force at the brushes B, sufficient to compensate for the drop in the battery voltage corresponding with the discharge taken from it, thus maintaining a practically constant electro-motive force on the consumption circuit L, notwithstanding the drop in the voltage of the battery H. If now, the switch S is thrown so as to connect the field windings F with the conductors 12, 13, and the switch T is closed, the second method of control will be thrown into operation. This method as illustrated includes the use of carbon regulator M, which has been fully described in United States Patent. In the present instance, this carbon regulator is controlled by a solenoid N connected into the alternating current circuit 7. The soft iron core of this solenoid N controls the pressure on the carbon piles of the carbon regulator M in the usual manner. The action of the field coils F is thus made responsive to variations of load on the alternator K, and by properly designing the various parts, the fluctuations of load occurring on the consumption circuit L may be thrown on the direct current generator G, or the battery H, instead of falling on the alternator K.

It will be understood that any suitable method of controlling the current in the field coils F may be used, and I do not confine myself to the two methods of control herein described and by referring to a rotary converter a motor generator is not excluded.

In general, the apparatus herein described may be utilized for transferring energy in either direction between an alternating current and a direct current circuit and for controlling such transfer, either automatically or otherwise, at the same time compensating for any undesirable voltage characteristic in either circuit.

By the foregoing use of words and language I do not intend to limit my invention further than the prior state of the art may require, but

What I claim is

1. A system of electrical distribution comprising the combination of a source of alternating current and its circuit, a source of direct current and its circuit, transforming apparatus operatively connected between the two sources, and means responsive to fluctuations on the alternating current circuit for compelling the transfer of energy in either direction between the direct current source and the alternating current circuit, said means including an armature connected in series between the alternating current terminals of the transforming apparatus and the alternating current circuit, substantially as described.

2. A system of electrical distribution comprising the combination of a source of alternating current and its circuit, a storage battery and its direct current circuit, transforming apparatus operatively connected between the two circuits, and means responsive to fluctuations on the alternating current circuit, for compelling the transfer of energy in either direction between the storage battery and the alternating current circuit, said means including an armature connected in series between the alternating current terminals of the transforming apparatus and the alternating current circuit, substantially as described.

In testimony whereof I have hereunto signed my name.

JOSEPH LESTER WOODBRIDGE.

Witnesses:
ALBERT TAYLOR,
W. O. KNUDSEN.